US010986812B2

(12) United States Patent
Nowling et al.

(10) Patent No.: US 10,986,812 B2
(45) Date of Patent: Apr. 27, 2021

(54) PAD-N-PAW

(71) Applicant: Lois Melinda Nowling, Jonesboro, GA (US)

(72) Inventors: Lois Melinda Nowling, Jonesboro, GA (US); Chond B. Shelton, Jonesboro, GA (US)

( * ) Notice: Subject to any disclaimer, the term of this patent is extended or adjusted under 35 U.S.C. 154(b) by 0 days.

(21) Appl. No.: 15/493,146

(22) Filed: Apr. 21, 2017

(65) Prior Publication Data
US 2018/0303064 A1    Oct. 25, 2018

(51) Int. Cl.
*A01K 15/02* (2006.01)
*E05F 15/71* (2015.01)
*A01K 13/00* (2006.01)
*E05F 15/77* (2015.01)
*E05F 15/75* (2015.01)
*H04W 88/02* (2009.01)

(52) U.S. Cl.
CPC ............ *A01K 15/021* (2013.01); *A01K 13/00* (2013.01); *E05F 15/71* (2015.01); *E05F 15/75* (2015.01); *E05F 15/77* (2015.01); *H04W 88/02* (2013.01)

(58) Field of Classification Search
CPC ....... A01K 15/021; A01K 13/00; A01K 15/02
USPC .................................................. 119/600, 174
See application file for complete search history.

(56) References Cited

U.S. PATENT DOCUMENTS

| 5,604,478 | A | * | 2/1997 | Grady | A01K 15/02 119/174 |
|---|---|---|---|---|---|
| 6,094,139 | A | * | 7/2000 | Moore | G08B 3/10 340/286.11 |
| 6,445,302 | B2 | * | 9/2002 | Vena | A01K 15/02 119/174 |
| 6,722,318 | B2 | * | 4/2004 | Hotmer | A01K 15/02 119/712 |
| 7,057,515 | B2 | * | 6/2006 | Smith | A01K 15/02 119/61.1 |
| 7,717,068 | B2 | * | 5/2010 | Wilson | A01K 15/02 119/174 |
| 9,818,247 | B2 | * | 11/2017 | Johnson | G07C 9/00309 |
| 2010/0283579 | A1 | * | 11/2010 | Kraus | G07C 9/00944 340/5.7 |
| 2014/0051355 | A1 | * | 2/2014 | Ahearn | G07C 9/00174 455/41.1 |
| 2015/0181014 | A1 | * | 6/2015 | Gerhardt | G07C 9/00309 455/420 |

(Continued)

*Primary Examiner* — Ebony E Evans
(74) *Attorney, Agent, or Firm* — Charlena Thorpe, Esq.; Incorporating Innovation LLC

(57) ABSTRACT

The present invention describes a training and communicating device for the domestic animals to allow the pets to signal their owners/trainers that they need to go outdoors for fresh air or toileting needs. The training and communicating device for the domestic animals comprises of a paw shaped device having pads containing the sensors inside which when touched by the pets, sends the signal to a voice activated monitor, which in turn transmits the signal to the owners/trainers that the pets need them. The device can also be used along with the smartphone for remotely operating the pet doors. A mobile application has to be installed in the smartphone and the pet's paw has to be registered with the device, which sends notification to smartphones whenever the pets send signals. The device also provides facilities like warming, massaging or even cleaning the paws of the pets.

5 Claims, 4 Drawing Sheets

(56) References Cited

U.S. PATENT DOCUMENTS

2016/0061481 A1* 3/2016 Wolfe .................. A01K 1/0353
                                                    236/51
2017/0187995 A1* 6/2017 Scalisi .................. H04N 7/186
2017/0220872 A1* 8/2017 Child ................. G06K 9/00771

* cited by examiner

PAD-N-PAW

FIELD OF THE INVENTION

The present invention generally relates to a device by which a pet can signal their owner about the need to go outside. More particularly the present invention enables the pets to communicate with their owner/trainer relating to the pet's toileting needs.

BACKGROUND OF THE INVENTION

The pets generally stay indoors in their respective houses along with the owners or trainers. Usually the owners/trainers of the pets often follow a routine where the pets are taken outdoors in order to provide them fresh air, or attend their toileting needs. Because of the busy schedules of the owners/trainers, sometimes such needs of the pets are forgot or unattended which can be unhygienic for both pets as well as the owners/trainers. The pets have to be allowed to breathe in the fresh air to keep them healthy.

The owners/trainers follow a routine where the pets have to be taken out at regular intervals to fulfil their needs. For example, many pets are well trained to relieve themselves only in the outdoors and so must be given frequent access to the outdoors according to the pet's biological needs. The owners might have provided the pet with the pet doors that allow the pets to go outdoor and come back home by itself as per its wish. There are certain devices also developed to assist the pets for the same purpose. But such devices also comes with several disadvantages which might let other animals, other than pets to enter the home which might lead to many problems. Another disadvantage which is accompanied by such devices is that, the devices has to be installed at the doors of the home which might require permanent alteration to the doors which is not possible in case of rented houses or apartments who would not allow such requests. The automatic systems can only open and close the doors for the pets, but cannot take care of the time spent by the pets in outdoors. And also in bad weather conditions, the pets need to be kept inside for their safety, which cannot be monitored by the automatic systems.

Because of these shortcomings of the available devices, the owners/trainers prefer to take the pets outdoors personally whenever the pets wish. But because of busy schedules, they might not be able to attend the pets personally every time in a day when the pet wishes to go outdoors. In such cases, the pets might become angry and impatient, leading behavioural changes such as severe barking, attacking the owner/trainer to scratch them or to scratch the door etc. Such situations of distress can create problems to pets, owner/trainers and neighbours as well.

Several systems and devices have been developed for the same purpose which are described below.

A state of the art U.S. Pat. No. 7,057,515B2 describes a Pet-activated signalling assembly which discloses a pet-activated signalling device allowing the pet to signal a human includes a base, and a cover, associated with the base. A biasing element is operatively coupled between the base and the cover and is configured to provide a positive biasing force there between. At least one audio signalling system is associated with the base and the cover and is activated in response to relative movement of the cover with respect to the base. At least one visual signalling system is associated with the base and the cover and is activated in response to relative movement of the cover with respect to the base.

Another state of the art U.S. Pat. No. 5,038,703A illustrates a Device and method to aid in toilet training pets, which discloses a training and communicating device for domestic animals which is mountable to a doorknob or other mounting element on or near a door. An elongated leather strip is provided with an aperture for removably suspending the strip from a doorknob. The strip also has a plurality of pairs of holes for securing through each pair of holes a sleigh bell onto the strip with vinyl lacing. The strip, with bells attached and suspended on or near the door within reach of an animal, produces sound when struck by the animal that may be heard throughout an average-sized home.

Another state of the art U.S. Pat. No. 4,400,696A illustrates an Animal actuated attention attracting apparatus enabling animals to attract attention of a keeper thereof when the animal desires to obtain entrance into a house or other building comprising a door mounted contact and wire feed through element, and adjustable hinged outside door mounted panel member, and adjustable contact member mounted on the hinged panel member for contact with the door mounted contact when the panel member is actuated, adjustable tension means for normally maintaining the hinged panel member in an unactuated contact position, an inside door mounted container provided with appropriate electrical energisation, wiring, and both visual and audible attention attracting elements, and a multiple position switch for permitting selection of the desired attention attracting element when the panel member is actuated by an animal.

The signally devices described in the state of the art patents can be activated by the pets and are being used by most of the users, which fairly allows the pets to indicate its desire to go outdoors or come back home. As explained earlier, the main shortcoming of such devices is the permanent alteration to be made for the door while installation which is not practical as well as economical because of the time and resources required for installation and several other complications. Also these devices can be used only at home as they are fixed. Also the signalling devices generally use audio signalling device that is remote from the signalling assembly which is expensive and complicated with high number of components. The cost of maintenance is also high if any component of the device gets damaged.

Therefore there is a need for an advanced device to aid the pets in potty training, where the pet signals the owner/trainer indicating that it wants to go outdoors to the bathroom or for fresh air. There is a need for a device that can also help those who has memory issues, so that the device indicates the need of the owner for the pets.

OBJECTIVES OF THE INVENTION

The primary object of the present invention is to provide a training and communicating device for the domestic animals through which a pet can signal the owner/trainer about the need to go outdoors.

Another object of the present invention is to provide a training and communicating device for the domestic animals that can warm, massage or even clean the paws of the pets.

Another object of the present invention is to provide a training and communicating device for the domestic animals which can be used along with the smartphones through an application.

Another object of the present invention is to provide a training and communicating device for the domestic animals which requires registration of the pets paw on the pad of the device, which gives a wireless signal to a monitor that signals the need for human interaction.

Another object of the present invention is to provide a training and communicating device for the domestic animals the application also allows the pets to go outdoors for enjoying or for toileting when the owner/trainer is not physically present with the help of a mechanism that will open a sliding door or unlock the doggy door.

SUMMARY OF THE INVENTION

The present invention provides a training and communicating device for the domestic animals to allow the pets to signal their owners/trainers that they need to go outdoors. The training and communicating device for the domestic animals comprises of a paw shaped device having pads containing the sensors inside which when touched by the pets, sends the signal to a monitor which in turn signals the owners/trainers that the pets need them at that instant. The pads in the paw shaped training and communication device has to be placed where the pets stay so that they can signal the owner/trainers whenever they require. The pads present in the training and communication device sends the wireless signal to the voice activated monitor, which is activated when the pets step or stand on the paw of the training and communication device.

The device has to be initially registered with the pet's paw so that it is identified whenever the pets step or stand on it. The device can also be linked to the smartphones of the owners/trainers. A mobile application has to be installed in the smartphones which provides the notification to be sent to the smartphones whenever the pets send signals. The mobile application installed in the smartphone also allows the pets to go outdoors for enjoying or for toileting when the owner/trainer is not physically present with the help of a mechanism that will open a sliding door or unlock the doggy door. The other facilities that are provided by the device includes warming, massaging or even cleaning the paws of the pets.

The present invention requires registration of the pets paw with the pad of the device, which gives a wireless signal to a voice activated monitor that signals the need for human interaction. The voice activated monitor gets activated when the pets stand or step on the paw. Once the signal is sent to the owner/trainers, they can provide personal assistance to the pets for taking them outdoors or they can remotely open the pet doors with the help of the application installed in their smartphones.

DETAILED DESCRIPTION OF THE INVENTION

The present invention describes a training and communicating device for the domestic animals known as PAD-N-PAW, which allows the pets to communicate with their owners/trainers. The training and communicating device can be used by the pets to signal their owners/trainers that they need to go outdoors for getting fresh air or toileting needs. The training and communicating device for the domestic animals is paw shaped pad containing the sensors inside which sends signal to the owners/trainers when touched by the pets.

The present invention can be better understood with the help of the drawings related to it.

Figure 1:
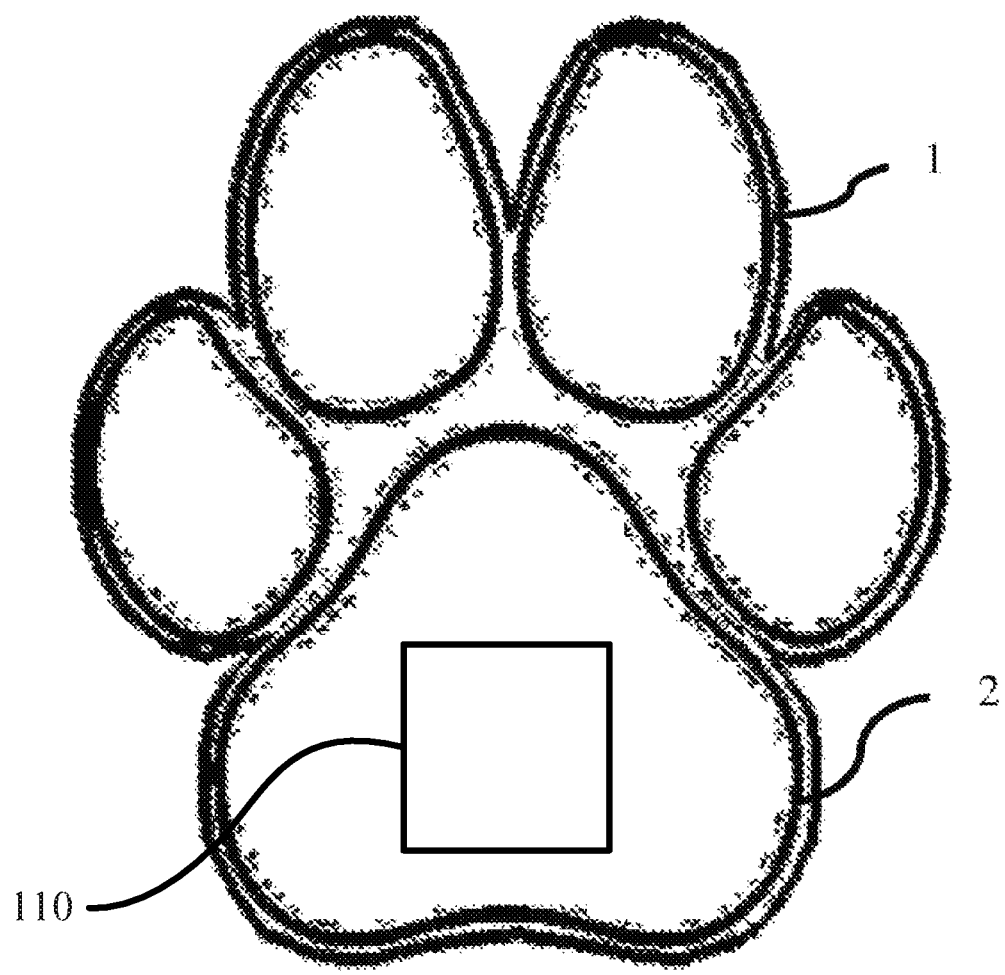
FIG. 1 illustrates Pad-n-Paw, the training and communication device that enables the pets to communicate with their owners/trainers.

FIG. 1 illustrates Pad-n-Paw, the training and communication device that enables the pets to communicate with their owners/trainers. The device has a pad which has sensors embedded in it that detects the movement made by the pets after touching it. The pad is in the shape of a pet animal's paw that can be placed where the pet's home is so that they communicate and signal the owner/trainers whenever they wish. The training and communication device 1 is in the form of an animal paw having four foot pads at the top and a metacarpal pad which is similar to the paw of a dog or a cat. The pad 2 has the sensors 110 embedded in it that sends the wireless signals to a voice activated monitor which signals the owners/trainers about the needs of the pets for human interaction.

Figure 2:
FIG. 2 illustrates Pad-n-Paw, the training and communication device along with the pet whose paw can be placed on the device.

FIG. 2 illustrates Pad-n-Paw, the training and communication device along with the pet's paw which can be placed on the device. The pets usually stay indoors along with their owner/trainers. The training and communication device 5 allows the pets 3 to send signals to their owner/trainers about their needs. The pets 3 have the paw 4 which has four foot pads and a wider metacarpal pad at the bottom. The training and communication device 5 is also developed in the same shape and pattern similar to that of the pet's paw 4. The pets 3 are trained to use the training and communication device 5 so that they can communicate with their owners/trainers.

Figure 3:
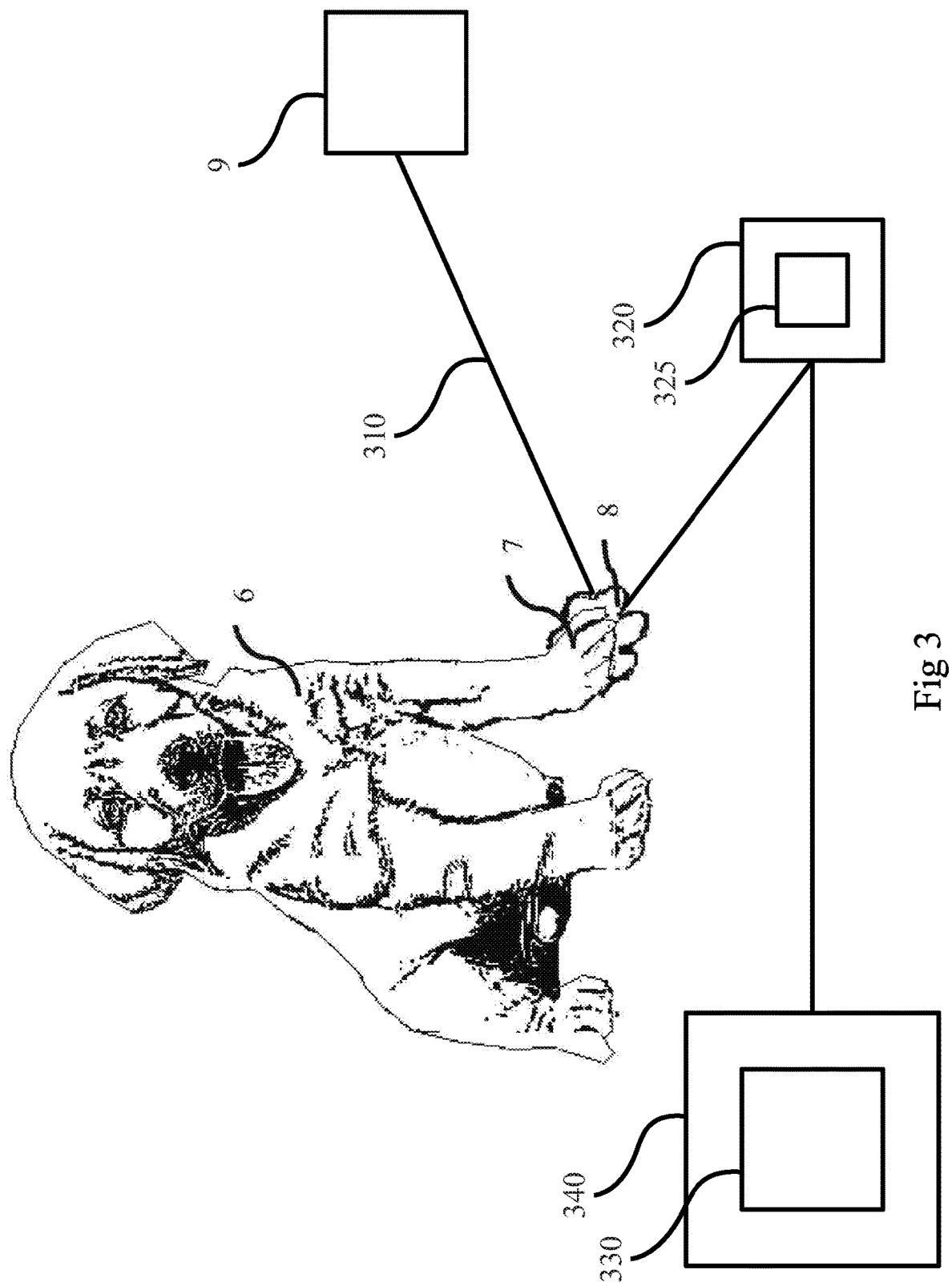
FIG. 3 illustrates pet's paw placed on the Pad-n-Paw, the training and communication device.

FIG. 3 illustrates pet's paw placed on the Pad-n-Paw, the training and communication device. The pet 6 are trained to use the training and communication device 8 so that they can signal their owners/trainers that they need to get outdoors for fresh air or toileting needs. The pets 6 are trained to place their paw 7 on the training and communication device 8 which is sensed by the sensors present in the pads of the training and communication device. When the pet 6 steps on or stands on the training and communication device 8 with its paw 7 placed on the device, the sensors in the pads triggers the activation of the voice activated monitor in order to signal the owners/trainers.

Figure 4:
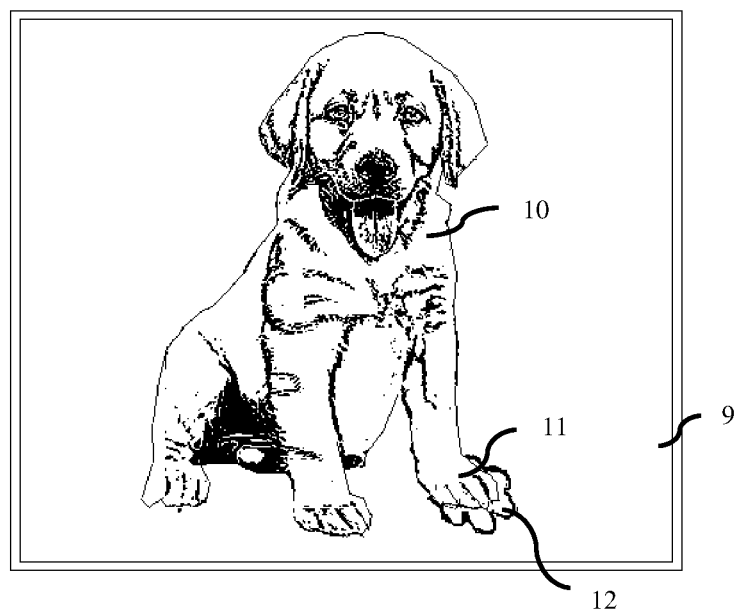
FIG. 4 illustrates the voice activated monitor that is activated by the pet after it places it paw on the Pad-n-Paw, the training and communication device which displays the pet on the monitor.

FIGS. 3 and 4 illustrates the voice activated monitor 9 that is activated by the pet after it places it paw on the Pad-n-Paw, the training and communication device which displays the pet on the monitor. The training and communication device 8, 12 is activated by the sensors present in the pad of the device, when the pet 6, 10 steps on or stands on the device 8, 12 with the paw 7, 11 placed on the device 8, 12. The training and communication device 8, 12 sends a wireless signal 310 to the voice activated monitor 9 that in turn signals the owners/trainers about the need of the pets 6, 10 for human interaction. The voice activated monitor 9 gets activated when the pets stand or step on the paw. Once the wireless signal is sent to the owner/trainers, they can provide personal assistance to the pets for taking them outdoors or they can remotely open the pet doors with the help of the application installed in their smartphones.

The present invention can be operated with the help of the smartphones 320 also. In order to operate the training and communication device through the smartphones, initially the training and communication device has to be registered with the pet's paw so that it is identified whenever the pets step or stand on it. The training and communication device can be linked to the smartphones of the owners/trainers by installing the pad-n-paw mobile application 325 in their smartphones. The mobile application detects the wireless signal sent by the pets and sends the notification directly to the smartphones. This allows the pets to go outdoors for enjoying or for toileting when the owner/trainer is not physically present, with the help of a mechanism 330 that will open a sliding door or unlock the doggy door 340. The other facilities that are provided by the training and communication device includes warming, massaging or even cleaning the paws of the pets. The training and communication device is made of weatherproof vinyl material which is hard and can withstand the pressure exerted by pets.

The method of operation of the present invention includes registration of the pets paw with the training and communication device, activation of sensors in the pad by the pets why standing on stepping on the pads of the training and communication device and transmitting the wireless signal from the training and communication device to a voice activated monitor that signals the need for human interaction. Once the signal is sent to the owner/trainers, they can provide personal assistance to the pets for taking them outdoors or they can remotely open the pet doors with the help of the application installed in their smartphones.

There are several advantages associated with the present invention. The training and communication device is mainly developed to aid the pets in potty training. The pets can use this device to indicate wanting to go outside and they can remind their owners/trainers to take them on a walk outdoors.

Another advantage of the present invention is that the pets can be trained to make physical contact with the device so that they can create a wireless signal.

Yet another advantage of the present invention is that the device can be placed at any location which is easily accessible by the pets so that they can communicate with their owners/trainers.

Yet another advantage of the present invention is that the device can just be placed at any location thus there is no time and cost required for installation of the device, and also there is no need for additional hardware or tools for working of the device. As there is no installation required, there is no need for alteration of any part of the residence.

Yet another advantage of the present invention is that it can also be used outdoors, and the pets the use these device outdoors to indicate that they might want to go inside home.

Yet another advantage of the present invention is that, as the device is placed on the floor, there are no chances of the device getting damaged. Also the device is made of weatherproof vinyl which prevents it from getting damaged.

Yet another advantage of the present invention is that it also provide other additional facilities like warming, massaging or even cleaning the paws of the pets.

We claim:

1. A training and communicating device for a domestic animals comprising:
   a paw shaped device comprising a pad having sensors embedded therein wherein the paw shaped device is configured to detect when the domestic animal touches the paw shaped device, determine whether the paw of the domestic animal that touches the paw shaped device matches a pre-registered paw, and send a wireless signal to communicate with a person only if the paw of the domestic animal that touches the paw shaped device matches the pre-registered paw;
   a monitor configureed to signal a person and display an image of the domestic animal that touches the paw shaped device when a wireless signal is received from the paw shaped device; and
   a mobile application configured to be installed on a smartphone and activate a notification on the smartphone when a wireless signal is received from the paw shaped device.

2. The training and communicating device of claim 1 wherein the mobile application is configured remotely to operate a door.

3. The training and communicating device of claim 1 wherein the paw shaped device automatically sends a wireless signal to the monitor when the domestic animal touches the paw shaped device.

4. The training and communicating device of claim 1 wherein the paw shaped device is made of a weatherproof vinyl material.

5. A method of using the training and communication device of claim 1, the method comprising:
   training a domestic animal to make contact with the paw shaped device;
   registering a paw of the domestic animal with the paw shaped device;
   determining whether a paw of a domestic animal that touches the paw shaped device matches the registererd paw; and
   transmitting a wireless signal to communicate with a person only if the paw of the domestic animal that touches the paw shaped device matches the registered paw.

\* \* \* \* \*